(12) United States Patent
Takazawa

(10) Patent No.: US 9,063,813 B2
(45) Date of Patent: Jun. 23, 2015

(54) APPARATUS, CONTROL METHOD, AND STORAGE MEDIUM

(71) Applicant: CANON KABUSHIKI KAISHA, Tokyo (JP)

(72) Inventor: Satoshi Takazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/459,763

(22) Filed: Aug. 14, 2014

(65) Prior Publication Data

US 2015/0058836 A1 Feb. 26, 2015

(30) Foreign Application Priority Data

Aug. 21, 2013 (JP) ................. 2013-171075

(51) Int. Cl.
*G06F 9/445* (2006.01)
(52) U.S. Cl.
CPC ........................................ *G06F 8/61* (2013.01)
(58) Field of Classification Search
CPC ................... G06F 8/60; G06F 8/61
USPC ................. 717/168, 170, 174, 175
See application file for complete search history.

(56) References Cited

U.S. PATENT DOCUMENTS

| 2005/0154823 | A1* | 7/2005 | Bruner et al. ................. 711/112 |
| 2007/0088753 | A1* | 4/2007 | Omoto et al. .............. 707/104.1 |
| 2015/0040113 | A1* | 2/2015 | Muench-Casanova et al. ............................. 717/168 |

FOREIGN PATENT DOCUMENTS

JP 2004318487 A 11/2004

* cited by examiner

*Primary Examiner* — Anna Deng
(74) *Attorney, Agent, or Firm* — Carter, DeLuca, Farrell & Schmidt, LLP

(57) ABSTRACT

An image forming device conducts software installation according to a script acquired from an external storage device, after connection of the external storage device. When conducting the software installation, the image forming device acquires from the external storage device and saves data related to software installation of a subsequent step to be conducted according to the script. The image forming device then provides a notification urging disconnection of the external storage device in response to saving of data related to software installation until a step directly after a software installation step that is being conducted.

11 Claims, 14 Drawing Sheets

FIG. 10

```
<?xml version="1.0" encoding="utf-8" ?>
<IScript xmlns:xsi="http://www.XXX.com/XMLSchema">
    <deviceId>
        <id>1234567890abc</id>
    </deviceId>
    <comment>Installtion script for MFP-100</comment>

<!-- Installation Script Commands -->
    <commands>
        <!-- Update Firmware -->
        <updateFirmwareCommand order="1">
            <relativeDirPath>Firmware</relativeDirPath>
            <firmwareName>Firmware_v1.0.1.zip</firmwareName>
        </updateFirmwareCommand >

<!-- Install applications -->
        <installApplicationCommand order="2">
            <relativeDirPath>App</relativeDirPath>
            <AppFileName>Application001.jar</AppFileName>
            <licenseRelativeDirPath>App</licenseRelativeDirPath>
            <licenseFileName>App001-License.lic</licenseFileName>
        </installApplicationCommand >

<!-- Start applications -->
        <startApplicationCommand order="3">
            <appId>1a2b3c4d-5e6f-6413-adee-00e0032fab94c</appId>
        </startApplicationCommand>

<!-- Activate embedded functions -->
        <activateEmbeddedFunctionCommand order="4">
            <relativeDirPath>EmbeddedFunc</relativeDirPath>
            <licenseFileName>EmbeddedFunc-License.lic</licenseFileName>
        </activateEmbeddedFunctionCommand >

<!-- Import device configuration files -->
        <importDeviceConfigCommand order="5">
            <relativeDirPath>DevConfig</relativeDirPath>
            <configFileName>deviceConfigurationFile.zip</configFileName>
        </importDeviceConfigCommand>
    </commands>
</IScript>
```

APPARATUS, CONTROL METHOD, AND STORAGE MEDIUM

BACKGROUND OF THE INVENTION

1. Field of the Invention

The present invention relates to a technology that increases the efficiency of software installation in an apparatus.

2. Description of the Related Art

When newly introducing an image forming device, it is necessary to perform initial setup work in advance corresponding to the usage environment of the image forming device. The initial setup work may include attachment of hardware options such as finishers that conduct finishing processing of printed material, and installation and setting operations for a control program of the image forming device.

Installation and setting operations for a control program of an image forming device are hereinafter referred to as software installation. That is, software installation is the installation of software and setting values corresponding to the software with respect to a subject apparatus. Software installation includes installation of setting information and extended programs with respect to the apparatus.

When conducting software installation with respect to an image forming device, it often happens that approximately identical configurations are established in the case of image forming devices that are introduced into the same usage environment. Accordingly, in order to efficiently conduct software installation, it is conceivable, for example, to import setting information that was exported from an image forming device for which a control program has already been set to an image forming device for which a control program has yet to be set.

Japanese Patent Application Publication Laid-Open No. 2004-318487 discloses a technology whereby data from an external storage device is automatically copied to a computer according to a program in the external storage device.

In order to reduce work costs by automating software installation, and reducing manual operations, it is conceivable to define an instruction manual (hereinafter referred to as a "script") presenting a work procedure, and execute software installation operations by a program according to the script.

However, with respect to the technology disclosed in Japanese Patent Application Publication Laid-Open No. 2004-318487, the following circumstances may arise with a method that is implemented by applying a software installation method using the aforementioned script. That is, with this method, as all data is copied to the apparatus from an external storage device without taking account of the script, the external storage device cannot be removed from the apparatus until data copying is completed.

In the case where the storage capacity of a copy destination is exceeded during data copying, the external storage device cannot be removed from the apparatus, because software installation must be conducted using the data inside the external storage device.

SUMMARY OF THE INVENTION

With the apparatus of the present invention, it is possible to remove an external storage device in the middle of software installation conducted according to a script in the external storage device, and proceed to a next software installation operation.

An apparatus of one embodiment of the present invention is an apparatus enabling connection of an external storage device, including: an installing unit which conducts software installation that installs software stored in the external storage device and setting values corresponding to the software, according to a script acquired from the external storage device after the external storage device is connected; a saving unit which, when the installing unit conducts software installation of a preceding step according to the script, acquires from the external storage device and saves the software and setting values corresponding to the software that relate to software installation in a subsequent step to be conducted according to the script; and a notifying unit which provides a notification that urges disconnection of the external storage device in response to saving by the saving unit of the software and setting values corresponding to the software that relate to software installation until a step directly after the software installation step that is being conducted by the installing unit.

Further features of the present invention will become apparent from the following description of exemplary embodiments (with reference to the attached drawings).

BRIEF DESCRIPTION OF THE DRAWINGS

FIG. 10 shows a script.

DESCRIPTION OF THE EMBODIMENTS (First Embodiment)

Figure 1:
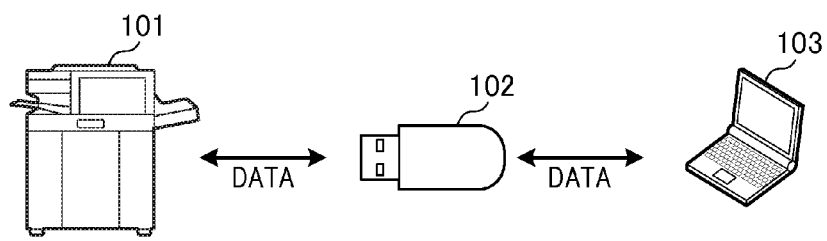
FIG. 1 shows a system configuration example of the present embodiment.

FIG. 1 is a drawing which shows a system configuration example of the present embodiment. An initial installation operations processing system shown in FIG. 1 executes initial installation operations including software installation.

The initial installation operations processing system includes an image forming device 101, a portable storage medium 102, and a client computer 103. The image forming device 101 is a multifunction peripheral which has multiple functions such as scanner, printer, facsimile, and file transmission functions. The image forming device 101 has an interface which connects the portable storage medium 102 that is an external storage device. There is no limitation on the type of interface for connection of the portable storage medium 102, but a USB (universal serial bus) is used in the present embodiment. By connecting the portable storage medium 102 to the USB interface, the image forming device 101 can conduct data read/write with respect to the portable storage medium 102.

There is no limitation on the portable storage medium 102, provided that it is a storage device that can be easily removed from the host equipment. In the present embodiment, as the portable storage medium 102, a USB storage 204 (FIG. 2) that implements USB mass storage class is used.

The client computer 103 is a personal computer, and has an interface for connecting the portable storage medium 102. There is no limitation on the type of interface that connects the portable storage medium 102. In the present embodiment, a USB interface is used. By connecting the portable storage medium 102 to the USB interface, the client computer 103 can conduct data read/write with respect to the portable storage medium 102. In addition, the client computer 103 has a web browser program, and various settings can be set for the image forming device 101 by accessing the website published by the image forming device 101.

Figure 2:
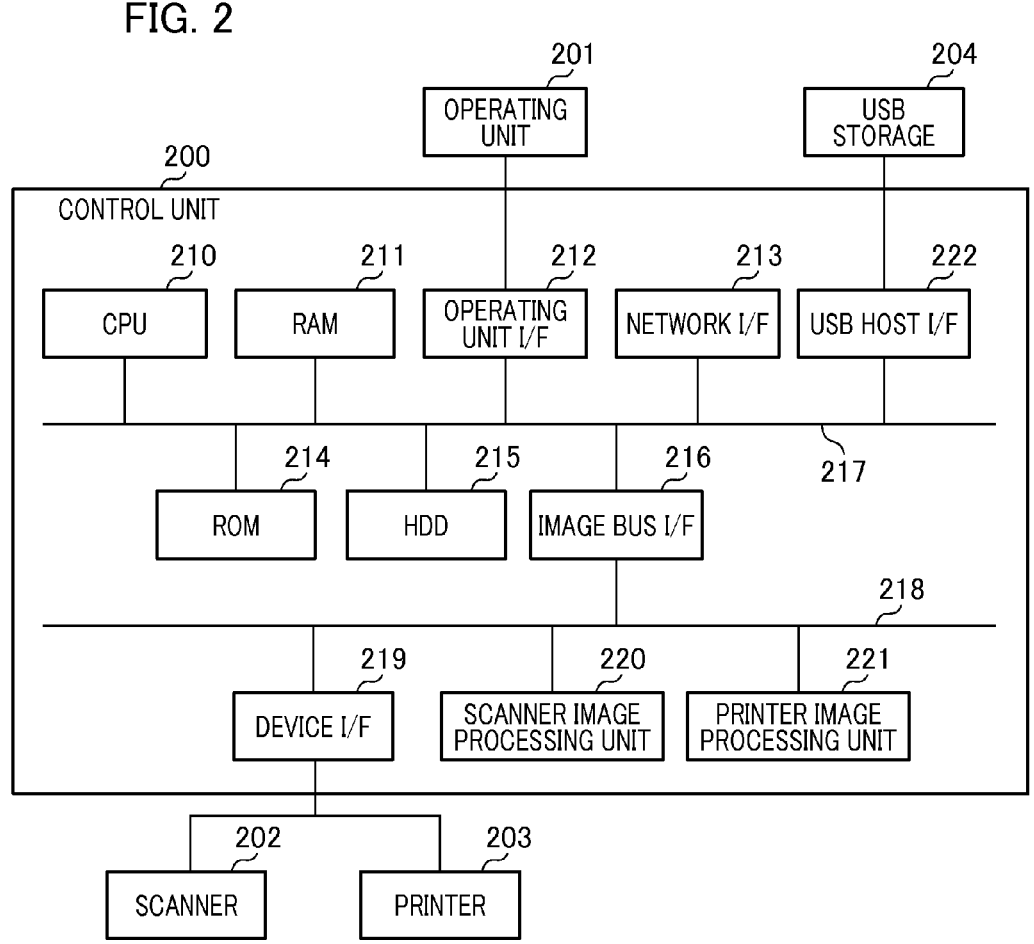
FIG. 2 shows a configuration example of an image forming device.

FIG. 2 is a drawing which shows a configuration example of an image forming device. The image forming device 101 includes a control unit 200, an operating part 201, a scanner 202, and a printer 203. The USB storage 204 is an external storage device for storing data, and can be removably attached to the image forming device 101. The USB storage 204 connects to the control unit 200 via a USB host I/F (interface) 222.

As a processing unit related to the operating part, the control unit 200 includes a CPU 210, a RAM 211, an operating unit I/F 212, a network I/F 213, a ROM 214, an HDD 215, an image bus I/F 216, a system bus 217, and a USB host I/F 222. CPU is an abbreviation for "central processing unit." RAM is an abbreviation for "random access memory." ROM is an abbreviation for "read only memory." HDD is an abbreviation for "hard disk drive."

As a processing unit related to printing and scanning, the control unit 200 includes an image bus 218, a device I/F 219, a scanner image processing unit 220, and a printer image processing unit 221. The control unit 200 includes as necessary the scanner 203 and the scanner image processing unit 220. The USB storage 204 is also removably attached to the image forming device 101 as necessary.

The CPU 210 is a controller for controlling the entirety of the control unit 200. The RAM 211 is memory for temporary storage of image data, and processing required for software operation.

The operating unit I/F 212 is an interface of the operating unit 201, and outputs image data that is displayed by the operating unit 201 to the operating unit 201. The operating part I/F 212 also transmits information that is input from the operating unit 201 by the user to the CPU 210.

The network I/F 213 connects with a network, and is an interface that conducts information exchange with an external device via the network. An external device refers to, for example, the client computer 103.

The USB host I/F 222 outputs data stored in the HDD 215 to the USB storage 204. In addition, the USB host I/F 222 reads data stored in the USB storage 204, and transmits the data that is read to the CPU 210. Multiple USB devices including the USB storage 204 can be connected to the USB host I/F 222.

The ROM 215 is a boot ROM, where a boot program of the system is stored. The HDD 215 stores system software, image data, setting information, and so on.

The image bus I/F 217 connects the system bus 217 and the image bus 218, and is a bus bridge that conducts data conversion. The system bus 217 is a shared data exchange path for the various components configuring the control unit 200.

The image bus 218 is constituted by a PCI bus or an IEEE 1394, and is a path for high-speed transfer of image data. The device I/F 219 connects the control unit 200 with the scanner 202 the printer 203 that are image input/output devices, and conducts synchronous/non-synchronous conversion of image data.

The scanner image processing unit 220 conducts correction, working, and editing of input images. The printer image processing unit 221 conducts correction, resolution conversion, and the like commensurate with printer performance with respect to image data that is output by printing.

Figure 3:
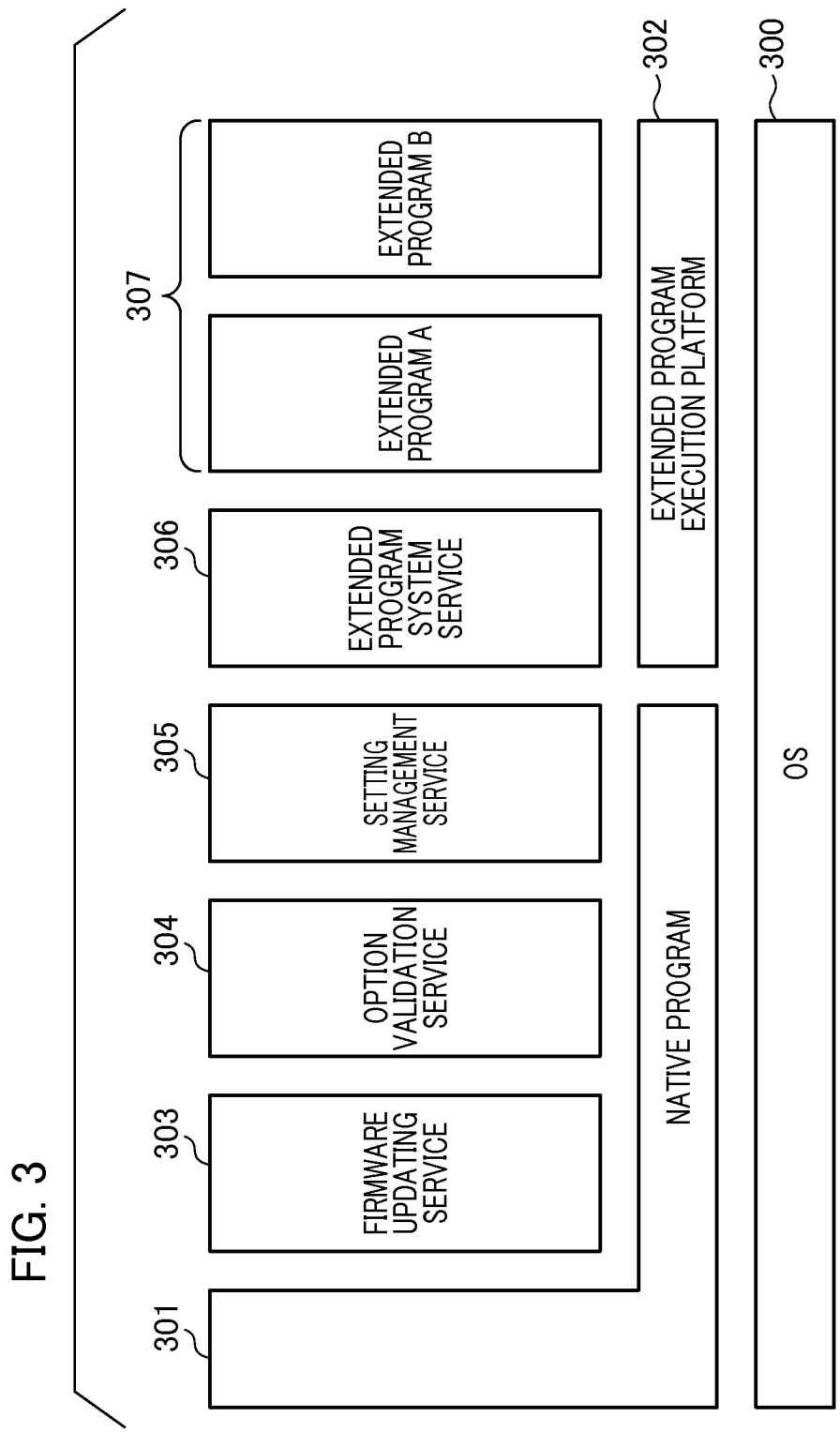
FIG. 3 shows an example of a software configuration of an image forming device for executing software installation.

FIG. 3 is a drawing which shows an example of a software configuration of an image forming device for purposes of performing software installation. A native program 301 and an extended program execution platform 302 operate on an OS 300. The native program 301 is an originally provided control program for a printer, fax machine, scanner, and the like. The extended program execution platform 302 is an execution platform for extended programs.

A firmware update service 303, an option validation service 304, and a setting management service 305 operate on the native program 301. An extended program system service 306, and an extended program 307 operate on the extended program execution platform 302.

The firmware update service 303 is a service which provides various functions for updating firmware. For example, referencing firmware designated by the user, the firmware update service 303 judges whether it is necessary to update the pertinent firmware. The firmware update service 303 also updates firmware with respect to the native program 301, or via the native program 301.

The option validation service 304 is a program for validating option functions previously incorporated into the native program 301 (also referred to below as incorporated option programs). The option validation service 304 identifies option functions specified by an option license file designated by the user, and validates them.

The setting management service 305 is a program for managing various types of setting information for the printers, the facsimile, and so on. The setting management service 305 provides a function that rewrites setting information for the native program 301 when, for example, a user designates a file containing one or more settings or pieces of setting information. Note that the setting management service 305 has a user interface (hereinafter "UI"), and the user can issue instructions to change settings via a setting menu screen (FIG. 7) displayed in the operating unit 201 of the image forming device 101.

The extended program system service 306 is a useful utility library shared by extended programs, and is provided by the system. By calling up the functions of the extended program system service 306 from the extended program 307, the labor of developing the extended program can be reduced.

The extended program 307 can access the various modules of the image forming device 101 such as other extended programs 307 only via the extended program execution platform 302 or the respective services (from 303 to 306). An extended program 307 that possesses a UI can display icons on a main menu screen (FIG. 6) that is displayed in the operating unit 201 of the image forming device 101.

When the operating part I/F 212 detects through the operating unit 201 that an icon on the main menu screen has been selected by a user, it transmits information indicating the selection to the CPU 210. The CPU 210 which has received the information indicating the aforementioned selection displays the UI of the extended program selected by the user in the operating unit 201.

The software configuration shown in FIG. 3 only pertains to essential portions, and the image forming device 101 may include other services and the like according to the environment of implementation. Moreover, services that are unnecessary due to restriction of settings or the like may be omitted from the image forming device 101.

Figure 4:
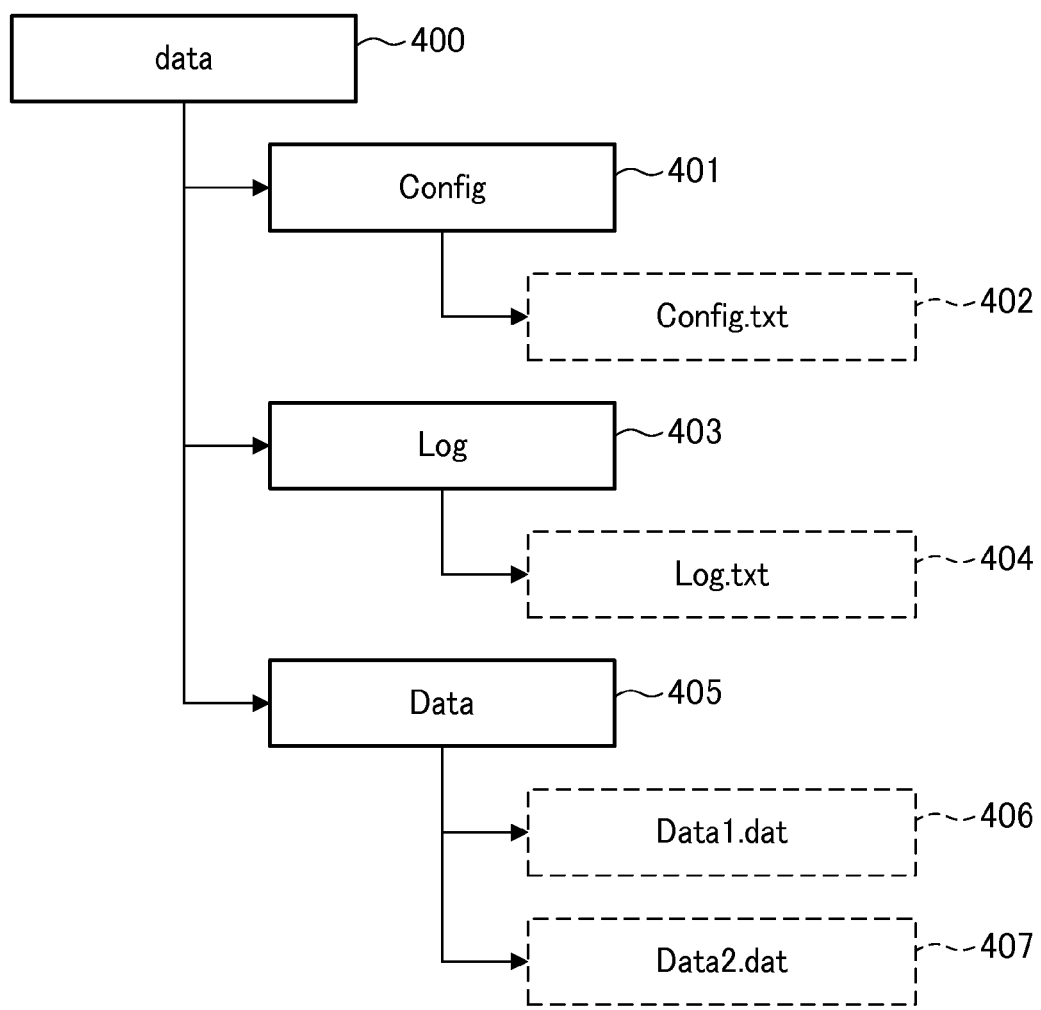
FIG. 4 shows an example of setting information of an extended program.

FIG. 4 is a drawing which shows an example of setting information of an extended program. Setting information of the extended program 307 is stored in the HDD 215, and is independently managed by the extended program 307. A data folder 400 is a folder which stores the setting information of the extended program 307. The data folder 400 is created by the extended program execution platform 302 when the extended program 307 is installed. A Config folder 401, a Log folder 403, and a Data folder 405 exist in the data folder 400. A Config.txt file 402 is stored in the Config folder 401.

The Config.txt file 402 is a file which perpetuates information necessary for operation of the extended program 307. Information necessary for operation of the extended program 307 is, for example, the IP address and the like of the server that is connected to, and in this example, is recorded in a manifest file in the Config.txt file 402. The manifest file is described below with reference to FIG. 5.

A Log.txt file 404 is stored in the Log folder 403. The Log.txt file 404 is a file which perpetuates a record of processing that executed by the extended program 307. A Data1.dat file 406 and a Data2.dat file 407 are stored in the Data folder 405. The Data1.dat file 406 and the Data2.dat file 407 are information processed by the extended program 307 (e.g., printing data).

Figure 5:
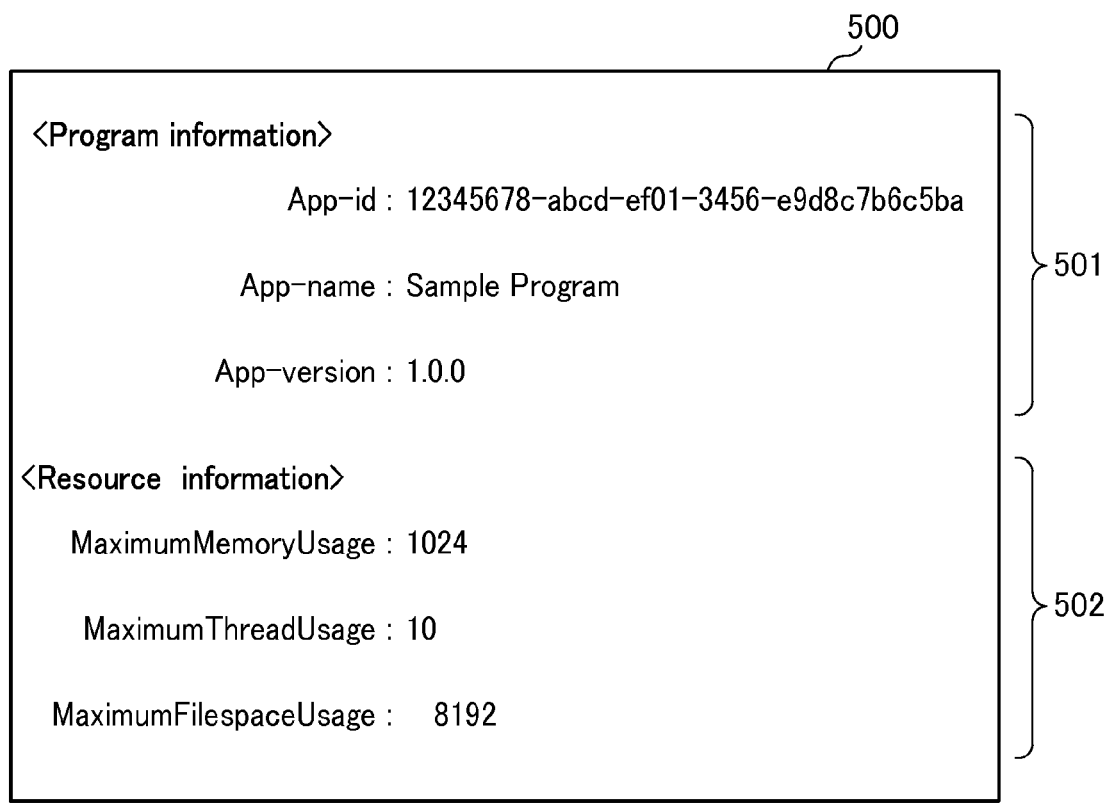
FIG. 5 shows a manifest file in the present embodiment.

FIG. 5 is a drawing which shows a manifest file in the present embodiment. In the present embodiment, the manifest file is recorded in the Config.txt 402, but the manifest file may also be prepared separately from the Config.txt 402, and may be saved in the data folder 400 of the extended program 307.

The manifest file 500 has a program information content part 501 and a resource information content part 502. Information relating to the extended program 307 is recorded in the program information content part 501. Specifically, an App-id that uniquely identifies the extended program 307, an App-name that refers to a name of the extended program 307, and an App-version that shows version information are recorded in the program information content part 501.

A resource usage amount that is used by the extended program is stored in the resource information content part 502. The extended program does not exceed the usage value stated in the resource information content part 502. In FIG. 5, MaximumMemoryUsage indicating the maximum memory usage amount of the extended program, and MaximumThreadUsage indicating a maximum thread usage amount are recorded in the resource information content part 502. In addition, a MaximumFilespaceUsage indicating a maximum filespace usage amount is recorded in the resource information content part 502.

The manifest file 500 shown in FIG. 5 is one example, and the information recorded in the manifest file is not limited to the information shown in FIG. 5. For example, an item indicating a minimum memory usage amount may be added to the resource information content part 502 in the case where a minimum memory usage amount is recorded, and deletions may be made when items are unnecessary.

Figure 6:
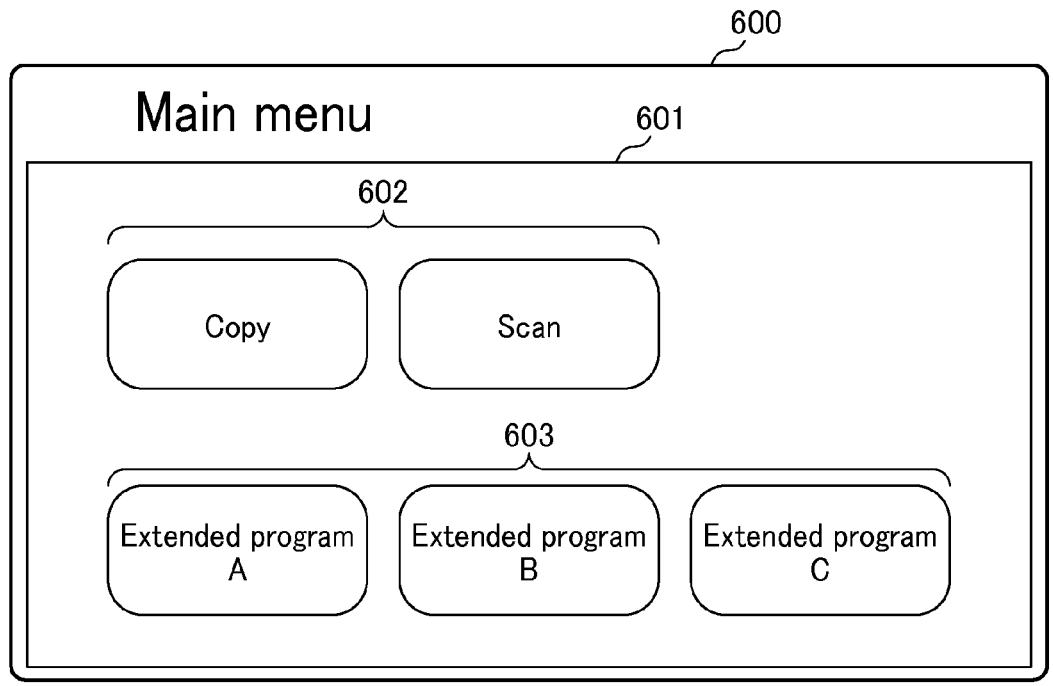
FIG. 6 shows an example of a main menu screen.

FIG. 6 is a drawing which shows an example of a main menu screen displayed in the operating part of the image forming device. The main menu screen 600 has a program icon display area 601, standard program icons 602, and extended program icons 603.

The program icon display area 601 is an area which displays icons of programs that are currently executable by the image forming device 101. The standard program icons 602 are icons that serve to display control program operating UIs. A control program operating UI is a UI that serves to operate functions of a control program of the image forming device 101. The extended program icons 603 are icons that serve to display extended program operating UIs. An extended program operating UI is a UI that serves to operate an extended program of the image forming device 101.

Figure 7:
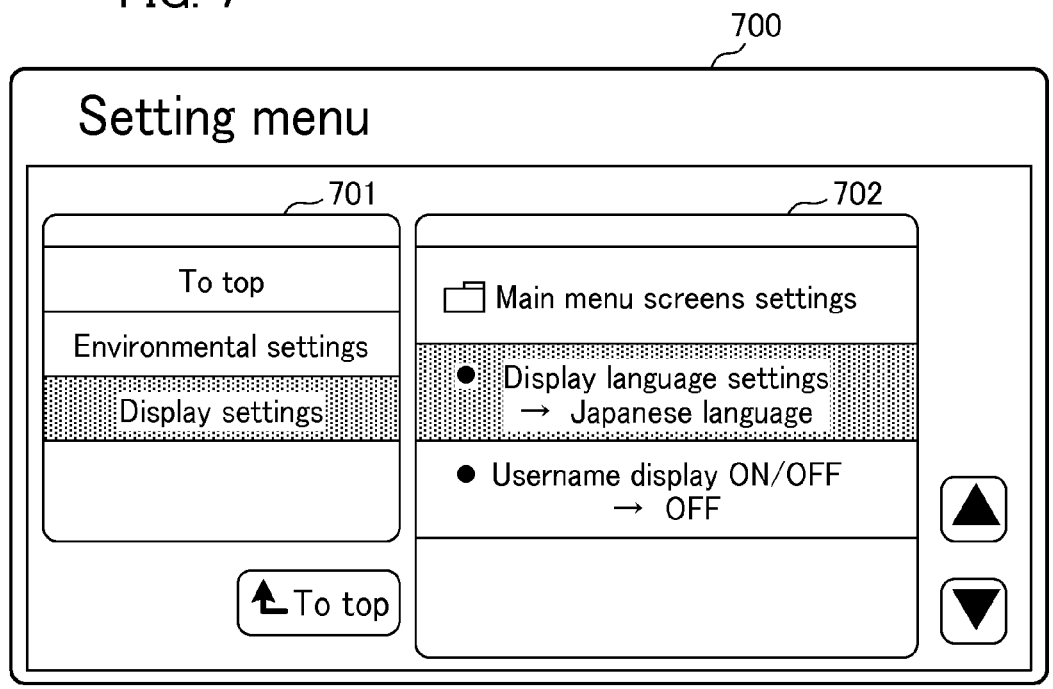
FIG. 7 shows an example of a setting menu screen.

FIG. 7 is a drawing which shows an example of a setting menu screen displayed in the operating part of the image forming device. A setting menu screen 700 has a category display part 701 and a detailed item display part 702. The category display part 701 displays categories that classify various setting items of the system. As specific examples of categories, the categories may include environmental settings, network settings, system management settings, and so on.

The detailed items display part 702 displays detailed items of a category selected from among categories displayed in the category display part 701. The example shown in FIG. 7 shows the circumstances of display of particular items when the display settings category is selected. A user can change the screen to a setting change screen (not illustrated in the drawing) by selecting an item from the detailed item display part 702 that he/she wishes to change. Note that "main menu screen settings" of the detailed item display part 702 of FIG. 7 indicates a category. When a user selects "main menu screen settings" displayed in the detailed item display part 702, "main menu screen settings" is displayed in the category display part 701, and additional detailed items pertaining to main menu screen settings are displayed in the detailed items display part 702.

A description is given below of initial installation operations of the image forming device. When performing initial installation operations of image forming devices, an operator prepares an image forming device (hereinafter "reference image forming device") in which settings are conducted in advance for distribution to other image forming devices. The operator connects the USB storage 204 to the reference image forming device, and exports setting information in an initial state. A description is not given of the method of export of setting information, but in the case where an export function is prepared in the native program 301 or the setting management service 305, this may be used. In the case where a web service (not illustrated in the drawing) is prepared in the image forming device, the setting information may be exported from a UI on the Web without using the USB storage 204.

Next, the operator prepares the firmware and applications required for execution of initial installation operations, and a file that records licensing information. The configuration of the folders and files within the USB storage 204 that are required for initial installation operations are described below with reference to FIG. 9.

The operator transitions to initial installation operations for the image forming devices that are the target of initial installation operations (distribution-target image forming devices). First, the operator installs an initial installation operations support program in the distribution-target image forming device. An initial installation operations support program is an extended program that serves to carry out initial installation operations.

Next, the operator inserts the USB storage 204 into the distribution-target image forming device, and carries out initial installation operations by the operating unit 201. The UI presented by the operating unit 201 is described below with reference to FIG. 13.

When initial installation operations are completed with respect to the transmission-target image forming device, or when a notice of USB removal feasibility is displayed, the operator removes the USB storage 204 connected to the transmission-target image forming device, and transitions to initial installation operations for the next transmission-target image forming device. Although it is desirable to have the initial installation operations support program installed at the stage where the image forming device is shipped from the production site, the operator may install it at the initial installation operations site.

Figure 8:
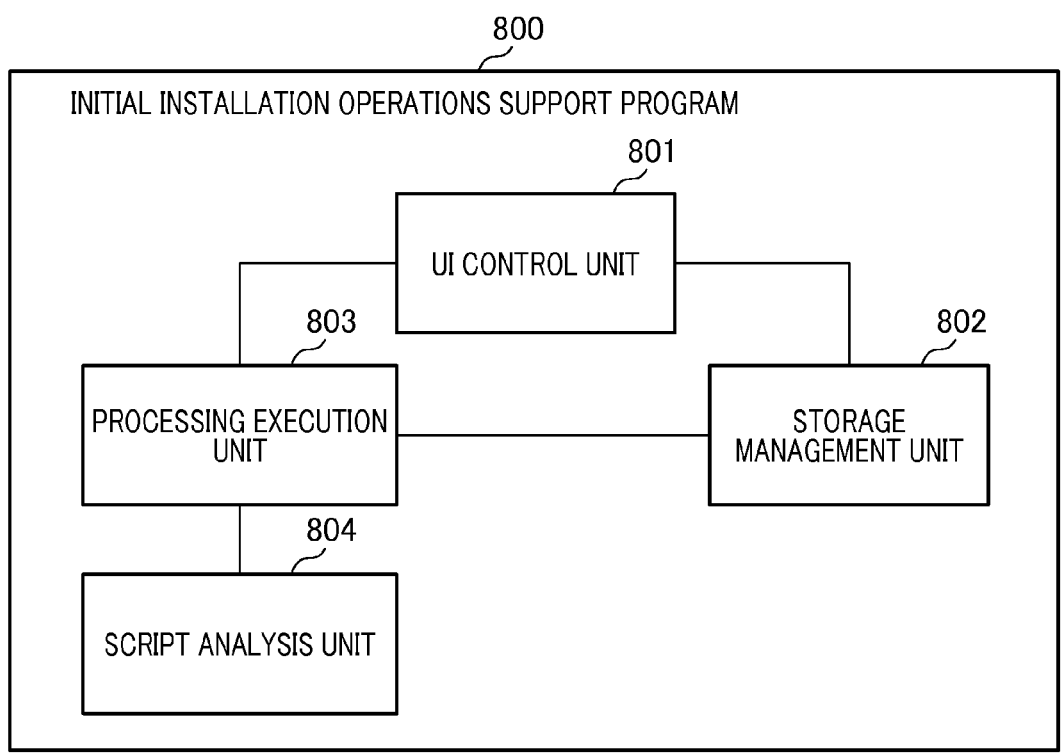
FIG. 8 shows an example of a functional configuration of an initial installation operations support program.

FIG. 8 is a drawing which shows an example of a functional configuration of an initial installation operations support program. An initial installation operations support program 800 is stored in the HDD 215 of the image forming device 101, and initial installation operations support functions are implemented by having it executed by the CPU 210.

The initial installation operations support program 800 has a UI control unit 801, a storage management unit 802, a processing execution unit 803, and a script analysis unit 804. The UI control unit 801 provides the user through the operating unit 201 with a UI for operating the initial installation operations support program, and accepts user manipulations.

The storage management unit 802 conducts read/write of data stored in the USB storage 204. The storage management unit 802 also detects insertion and removal of the USB storage 204.

The processing execution unit 803 conducts the processing of various initial installation operations according to the instructions of the UI control unit 801, the storage management unit 802, and the script analysis unit 804. The script analysis unit 804 analyzes the script stored in the USB storage 204, and determines the initial installation operations to be performed by the processing execution unit 803, and the sequence thereof.

Figure 9:
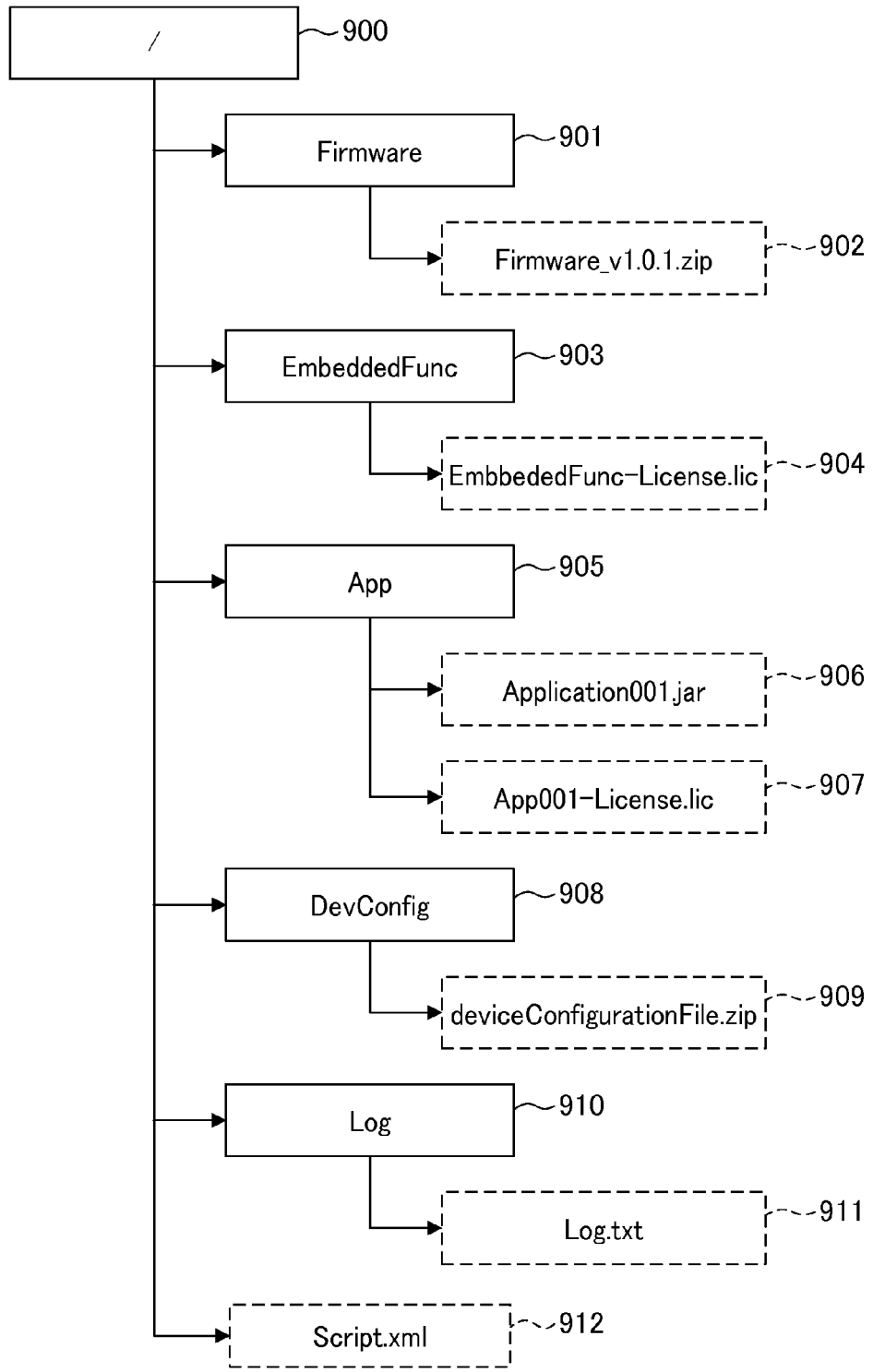
FIG. 9 shows an example of a folder and file configuration inside USB storage used by the initial installation operations support program.

FIG. 9 is a drawing which shows an example of a folder and file configuration in the USB storage that is used by the initial installation operations support program. In a root folder 900, there is a Firmware folder 901, an EmbeddedFunc folder 903, an App folder 905, a DevConfig folder 908, a Log folder 910, and a Script.xml file 912.

The Firmware folder 901 is a folder which stores firmware to be updated with respect to the image forming device 101. In the Firmware folder 901, there is a Firmware_v1.0.1.zip file 902 wherein a firmware group is archived in zip format.

The EmbeddedFunc folder 903 is a folder which stores a licensing file for activating functions that are preinstalled in the image forming device 101. The EmbeddedFunc folder 903 contains a licensing file EmbeddedFunc-License.lic 904.

The App folder 905 is a folder which stores an extended program to be installed in the image forming device 101 in the initial installation operations, and a licensing file required for installation of the extended program. The App folder 905 contains an extended program Application001.jar 906 and a licensing file App001-License.lic 907.

The DevConfig folder 908 is a folder which stores setting information that is preset in and exported by the reference image forming device. The DevConfig folder 908 contains a deviceConfigurationFile.zip 909 file that is archived in zip format.

The Log folder 910 is a folder for storing a file (hereinafter "log") of the results obtained by executing the initial installation operations support program. The Log folder 910 contains a Log.txt 911.

The Log folder 910 and the Log.txt 911 do not exist prior to execution of the initial installation operations support program. This folder and this file are created, by the initial installation operations support program, by once creating them in a temporary Log folder 403 and Log.txt 404 and then copying them during or after execution of the initial installation operations support program.

The Script.xml 912 is a script which indicates an operational procedure for automatically processing initial installation operations. Details of the script are described below with reference to FIG. 10. This script is a file which defines an initial installation operations procedure. The image forming device 101 may determine whether or not it is feasible to execute the initial installation operations support program by the existence or non-existence of the script file 912. That is, the existence itself of the script file 912 may constitute an identifier indicating that the USB storage 204 that is being used is the USB storage for the initial installation operations support program. The configuration of the initial installation operations support program shown in FIG. 9 is exemplary, the configuration is not limited thereto, and any folder configuration may be adopted.

FIG. 10 is a drawing which shows a script used in the present embodiment. A script is an instructional sheet that shows operational procedures for automatically executing the initial installation operations of the image forming device 101.

A script 1000 is read by the storage management unit 802 of the initial installation operations support program 800, and is analyzed by the script analysis unit 804 via the processing execution unit 803. When the script 1000 is analyzed by the script analysis unit 804, the processing execution unit 803 executes the initial installation operations recorded in the script 100 based on the analytic results.

The script 1000 shown in FIG. 10 is recorded in XML (extensible markup language), and has an image forming device identification part 1001 and a processing content part 1002. In FIG. 10, the script is expressed by XML, but the script expression format is not limited to XML, and may be written in shell script or the like.

The image forming device identification part 1001 records information for identification of the image forming device 101 that is the subject of initial installation operations. The image forming device identification part 1001 has a <deviceId> that is an identifier of the image forming device 101, and a <comment> that shows the content of this script in an arbitrary character string. The <comment> may be used not only for describing content of this script, but also as an identifier in the case where identification is not possible with the <deviceId> alone. For example, it may be used as an identifier in the case where it is necessary to prepare multiple settings with respect to a single image forming device 101.

The processing content part 1002 records a processing group required for execution of initial installation operations. In FIG. 10, the processing content part 1002 has a firmware update processing 1003, an extended program installation processing 1004, and an extended program initiation processing 1005. The processing content part 1002 also has a system-embedded option program activation processing 1006, and a setting information import processing 1007. Order attribute is contained within a tag that shows the processing of the respective initial installation operation. In this example, the order of initial installation operations is determined according to order values. In the case where there is no particular designation of processing order, it is also possible to make order values identical.

In the case where order values are identical, the processing execution unit 803 may execute processing in the order of writing in the processing content part 1002, or it may execute processing in the order of reading by the script analysis unit 804. The processing execution unit 803 may judge the order of execution based on the volume of data used by each processing.

The firmware update processing 1003 is processing which updates firmware via a firmware update service 303. The firmware update processing 1003 defines processing according to the content of an <updateFirmwareCommand> tag, and designates the file that is used by a <relativeDirPath> tag and a <FirmwareName>. A relative path from the root folder 900 to a firmware to be updated is recorded in the <relativeDirPath> tag. A firmware to be updated is designated in the <FirmwareName> tag. In FIG. 10, firmware that is archived in Zip format is designated.

The extended program installation processing 1004 defines processing according to the content of an <installApplicationCommand> tag. The extended program that is installed is designated by a <relativeDirPath> tag and an <AppFileName> tag.

A relative path from the root folder 900 to an actual extended program that is the object of installation is recorded in the <relativeDirPath> tag. The entity of extended program that is the object of installation is designated in the <AppFileName> tag. In FIG. 10, an extended program of the Jar file format is designated, but the format of the extended program is not limited to the Jar file format.

A license for the extended program that is the object of installation is designated by the <licenseRelativeDirPath> tag and the <licenseFileName> tag. A relative path from the root folder 900 to the license file of the extended program is recorded in the <licenseRelativeDirPath> tag. An entity of a license of the extended program is designated in the <licenseFileName> tag. In FIG. 10, a license file of the lic file format is designated, but the license file format is not limited thereto.

The extended program initiation processing 1005 defines processing according to the content of a <startApplicationCommand> tag, and designates an extended program subject to initiation by an <appId> tag. An ID which uniquely identifies the extended program subject to initiation is designated in the <appId> tag. The ID designated in the <appId> tag corresponds to the App-id recorded in the program information content part 501 of the manifest 500 shown in FIG. 5.

The embedded option program activation processing 1006 defines processing according to a content of an <activateEmbeddedFunctionCommand> tag, and designates an embedded option program that is activated by a <relativeDirPath> tag and a <licenseFileName> tag.

A relative path from the root folder 900 to the license file of the embedded option program that is activated is recorded in the <relativeDirPath> tag. An entity of a license for validating the embedded option program is designated in the <licenceFileName> tag. In FIG. 10, a license file of the lic format is designated, but the license file format is not limited thereto. In the case where a preinstalled embedded option program does not exist in the image forming device 101, or in the case where it is not validated, the content of this initial installation operation processing is unnecessary.

The setting information import processing 1007 defines processing according to the content of an <importDeviceConfigCommand>. A setting information file that is imported is designated by a <relativeDirPath> tag and a <configFileName> tag.

A relative path from the root folder 900 to the setting information file subject to import is recorded in the <relativeDirPath> tag. The setting information file subject to import is designated in the <configFileName> tag. In the present drawing, a setting information file archived in Zip format is designated, but the format of the setting information file is not limited to the Zip file format.

The initial installation operation processing of the script is not limited to the processing recorded in the script 1000 of FIG. 10. For example, it is also acceptable to add rebooting processing of the image forming device 101 and the like to the script 1000. Duplication, and addition or deletion may also be carried out as necessary.

Figure 11:
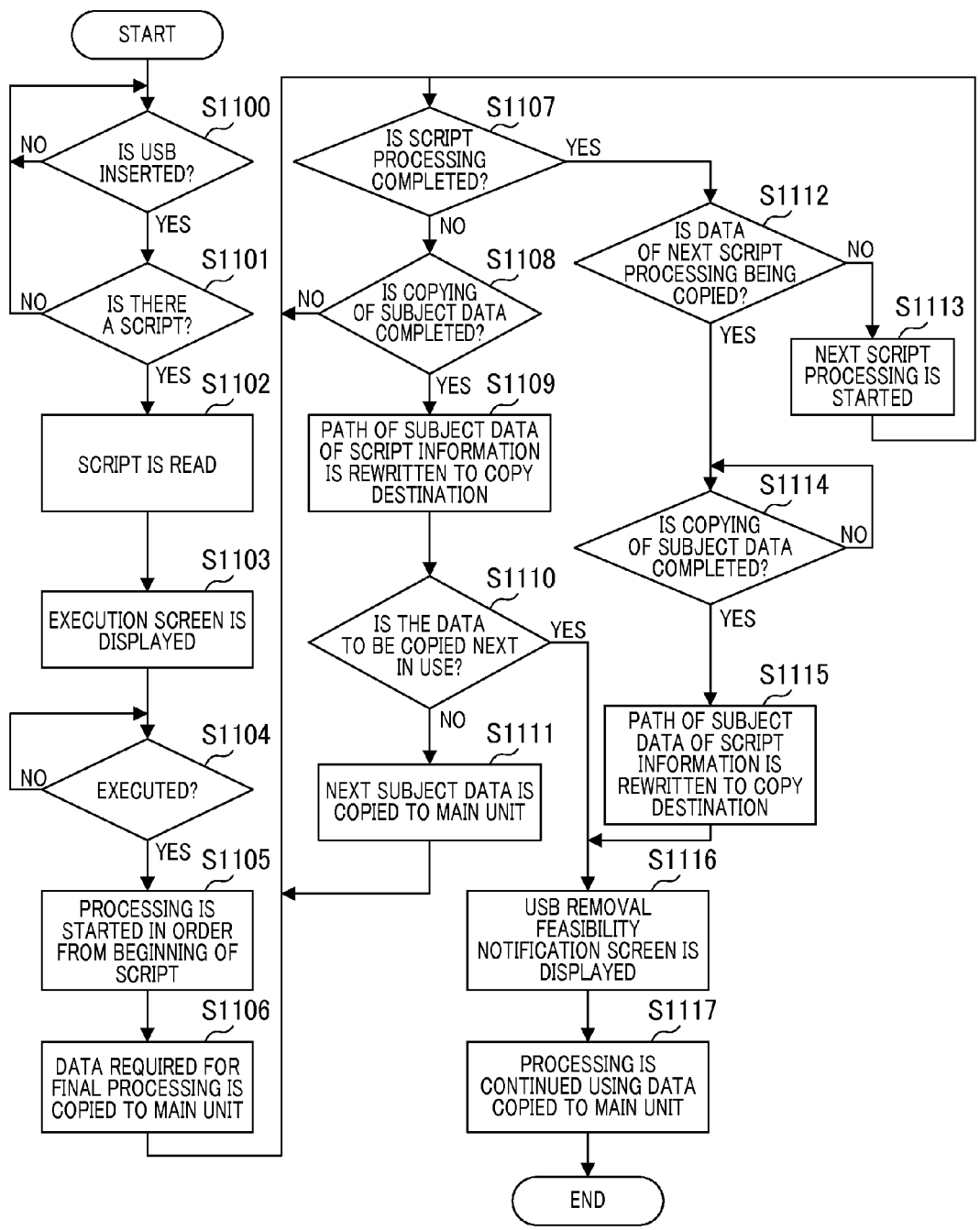
FIG. 11 is a flowchart which describes software installation processing of a first embodiment.

FIG. 11 is a flowchart which describes software installation processing of the first embodiment. In FIG. 11, initial installation operations of an initial installation operations support program of an image forming device are exemplified for description.

First, the storage management unit 802 judges whether insertion of the USB storage 204 into the image forming device 101 has been detected (S1100). In the case where the storage management unit 802 detects insertion of the USB storage 204, the processing advances to S1101. In the case where the storage management unit 802 does not detect insertion of the USB storage 204, the processing returns to S1100.

In S1101, the storage management unit 802 judges whether a script file 912 is stored in the inserted USB storage 204. In the case where a script file 912 is stored in the USB storage 204, the processing advances to S1102. In the case where a script file 912 is not stored in the USB storage 204, the storage management unit 802 judges that the USB storage 204 is not a USB storage for initial installation operations, and the processing returns to S1100.

In S1102, the script analysis unit 804 reads this script file 912 (FIG. 9) that is stored in the USB storage 204 (S1102). The information of the script file 912 that is read is temporarily stored in the RAM 211 until the processing terminates. In this processing, the script analysis unit 804 may analyze what is executed in which order for the respective initial installation operations recorded in the script 1000, and may confirm whether the files used in performing the initial installation operations are stored in the USB storage 204. In this example, analysis of the initial installation operations execution sequence, and file confirmation are completed in the script reading processing (S1102).

Next, the processing execution unit 803 displays a UI screen of the initial installation operations support program via the UI control unit 801 based on the script information read in S1102. Specifically, the processing execution unit 803 displays the execution screen shown in FIG. 12 (S1108).

Figure 12A:
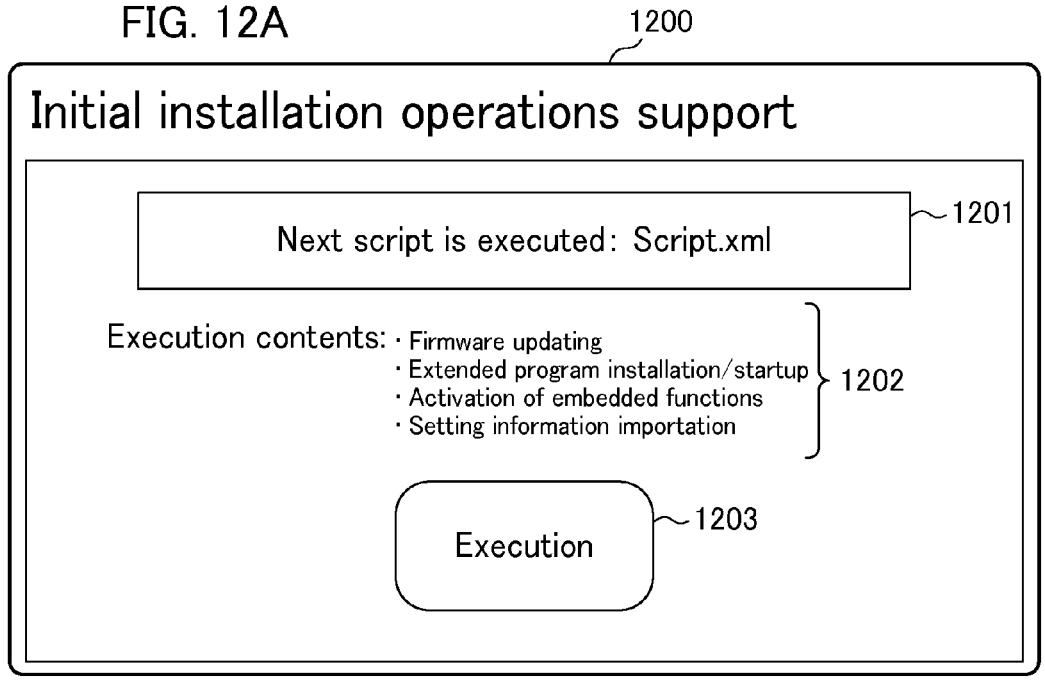
FIG. 12A and FIG. 12B show examples of UI screens of the initial installation operations support program.

FIG. 12 is a drawing which shows an example of a UI screen of an initial installation operations support program. FIG. 12A shows an execution screen 1200. The execution screen 1200 is a screen for initiating execution of initial installation operations.

The execution screen 1200 has an execution script display part 1201, an execution content display part 1202, and an execution button 1203. The processing execution unit 803 displays a file name of the script contained in the USB storage 204 in the execution script display part 1201. In the case where multiple scripts are to be executed, the processing execution unit 803 may display all of the scripts, or it may display only one script. The execution screen 1200 shown in FIG. 12A displays that Script.xml is to be executed.

Based on the script information read in S1102 of FIG. 11, the processing execution unit 803 displays the processing group to be subsequently executed in the execution content display part 1202. The execution button 1203 is a button that is manipulated to initiate processing after the user has completed a check of the execution script display part 1201 and the execution content display part 1202.

Returning to the description of FIG. 11, in S1104, the UI control unit 801 judges whether the execution button 1203 has been pressed. In the case where the execution button 1203 has been pressed, the processing advances to S1105. In the case where the execution button 1203 has not been pressed, the processing returns to S1104.

In S1105, the processing execution unit 803 initiates processing in order from the initial installation operations that are first designated, according to the execution sequence of initial installation operations analyzed in S1102. When processing is initiated, the processing execution unit 803 changes the UI screen of the initial installation operations support program to the screen shown in FIG. 12B (implementation screen), and notifies the user that initial installation operations have started. In the description that follows, the processing that initiates initial installation operations according to the script processing sequence is described as "script processing".

Figure 12B:
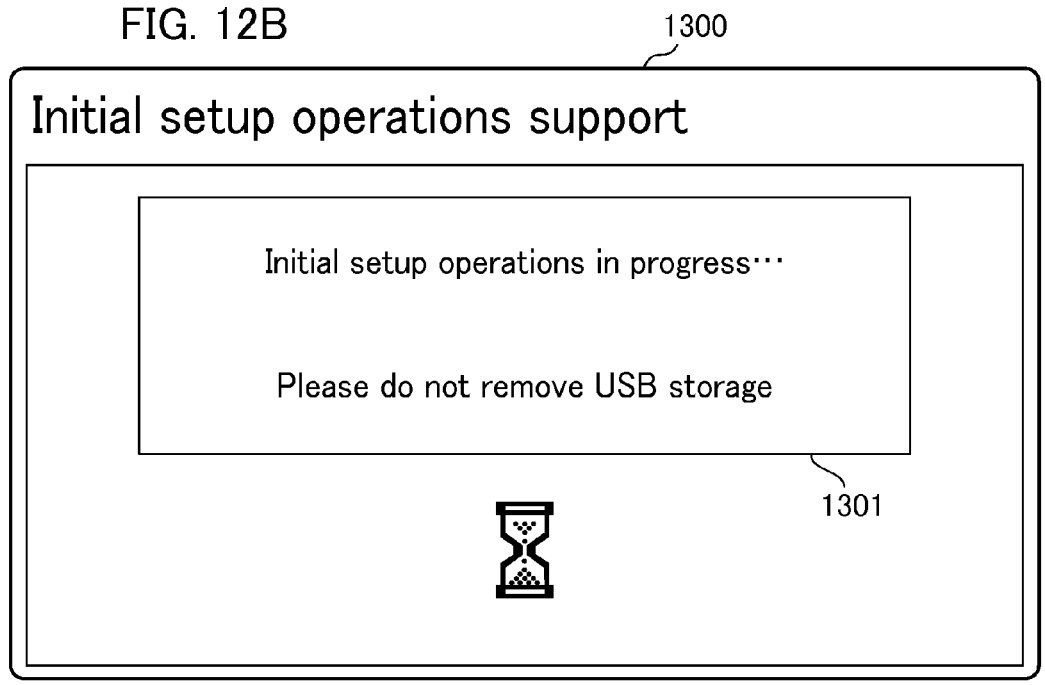

FIG. 12B shows an implementation screen 1300. The implementation screen 1300 is a screen which provides notification that execution of initial installation operations is underway. The implementation screen 1300 has a message display part 1301 and an implementation icon. The implementation icon is an icon which shows that initial installation operations are in the process of execution. The processing execution unit 803 displays a message indicating that initial installation operations have started and are being executed in the message display part 1301. As data in the USB storage 204 is being used, the processing execution unit 803 displays information instructing that the USB storage 204 is not to be removed.

Returning to the description of FIG. 11, in S1106, the processing execution unit 803 copies data required for the initial installation operations that were last designated to the HDD 215 according to the execution sequence analyzed in S1102. In the present embodiment, the data required for initial installation operations is the software used in software installation, and the setting values corresponding to the software. In this example, the destination to which the data subject to copying is copied is the Data folder 405, and the data subject to copying is the Data1.dat 406 and the Data2.dat 407.

In this example, termination of copying of all data required for the respective initial installation operations recorded in the processing content part 1002 shows that the processing that conducts copying to the HDD 215 is completed. That is, when conducting the software installation of the preceding step according to the script, the processing execution unit 803 acquires data relating to the software installation of the subsequent step to be conducted according to the script from an external storage device, and saves it. The processing execution unit 803 preferentially copies data relating to the software installation of the step that comes later in the order recorded in the script. In the subsequent description, the processing that copies data referenced by the content of a single operation is described as "copy processing".

Next, the processing execution unit 803 judges whether the script processing of S1105 has been completed (S1107). In the case where script processing is completed, the processing advances to S1112. In the case where script processing is not completed, the processing advances to S1108.

In S1108, the processing execution unit 803 judges whether copy processing of the data subject to copying is complete. At this time, script processing is in an incomplete state. In the case where copy processing is complete, the processing advances to S1109. In the case where copy processing is not complete, the processing returns to S1107, and standby ensues until script processing or copy processing is completed.

In S1109, the processing execution unit 803 executes the following processing via the script analysis unit 804. The processing execution unit 803 rewrites the path recorded in the script information temporarily stored in the RAM 211 in S1102—i.e., the path to the data required for the initial installation operations—to the copy destination. According to this processing, the path in the USB storage 204 that is recorded in the script in the initial state is rewritten to the Data folder 405 that is the copy destination.

Figure 13:
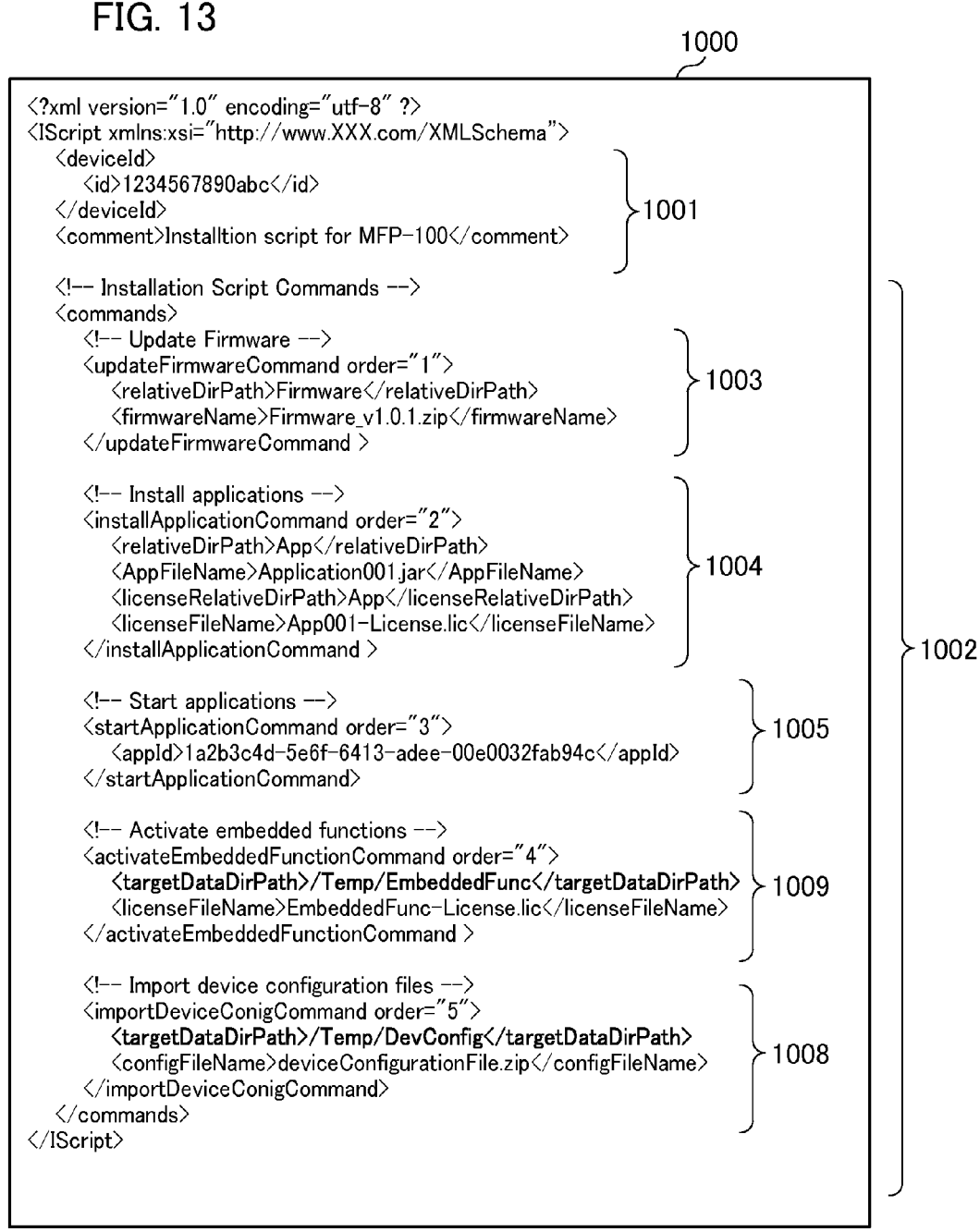
FIG. 13 is a drawing which describes rewriting of script content.

FIG. 13 is a drawing which describes rewriting of script content. The description exemplifies the case where the script described with reference to FIG. 10 is rewritten by S1109 of FIG. 11. FIG. 13 shows a script description in a state where copy processing until the system-embedded option program activation processing 1009 is completed. Only the portions that differ from FIG. 10 are described.

In the setting information import processing 1008, the <relativeDirPath> tag is rewritten to <targetDataDirPath>. In the system-embedded option program activation processing 1009, the script description is rewritten to the <targetDataDirPath> tag. In the present embodiment, the <targetDataDirPath> tag is used in order to show that the Data folder 405 is referenced, but the reference is not limited thereto, and any tag may be used.

Returning to the description of FIG. 11, when the script rewriting of S1109 is completed, the processing advances to S1110 in order to initiate the next copy processing. The next subject of copy processing refers to all data required with respect to the content of operations for which copy processing has yet to be executed, and operations have yet to be conducted, when being counted from the end of the processing order of the script. In other words, the data that is next subject to copy processing is the data used in the nearest step requiring data for processing, prior to the step in which data copying was completed.

The processing execution unit 803 judges whether the data that is next subject to copying is being used by script processing (S1110). For example, when the script 1000 in FIG. 13 is referenced, the copying operation until the system-embedded option program activation processing 1009 is completed. The processing which is executed prior to the system-embedded option program activation processing 1009, and which is the nearest processing requiring data for processing is the extended program installation processing 1004. Accordingly, the processing execution unit 803 references the data of the extended program installation processing 1004 as the next copying subject.

In the case where extended program installation processing is executed as script processing, or where extended program initiation processing is conducted upon execution of extended program installation processing, the processing execution unit 803 judges that the data subject to copying is being used by script processing.

In the case where the data subject to copying is being used by script processing, the processing execution unit 803 judges that subsequent copying is unnecessary, and the processing advances to S1116. In the case where the data subject to copying is not being used by script processing, the processing advances to S1111.

In S1111, the processing execution unit 803 executes copy processing with respect to the next subject data, and the processing returns to S1107. In S1116, the processing execution unit 803 displays a USB removal feasibility notification screen via the UI control unit 801, and the processing advances to S1117. The USB removal feasibility notification screen is a screen that provides notification that the USB storage 204 can be removed. That is, the processing execution unit 803 provides notification that urges disconnection of the USB storage 204 in response to the fact that data relating to software installation until the step directly after the software installation step that is being conducted has been copied. In S1116, the processing execution unit 803 may also automatically unmount the USB storage 204 without displaying the screen.

Figure 14A:
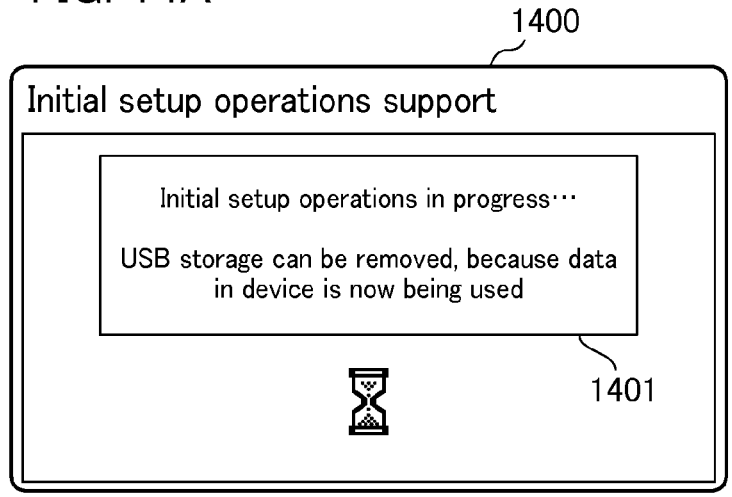
FIG. 14A-14C show examples of UI screens of the initial installation operations support program.

FIG. 14A shows a USB removal feasibility notification screen 1400. The USB removal feasibility notification screen 1400 has a message display part 1302 and an implementation icon. The processing execution unit 803 displays a message indicating that initial installation operations are being executed in the message display part 1302. As initial installation operations can be continued without using data inside the USB storage 204 by means of the aforementioned copy processing, the processing execution unit 803 displays information indicating that the USB storage 204 can be removed. Note that the processing execution unit 803 may unmount the USB storage 204 while simultaneously displaying the USB removal feasibility notification screen 1400, and may display a notice that unmounting has occurred in the message display part 1302.

Returning to the description of FIG. 11, in S1117, the processing execution unit 803 continues the script processing using the data that was copied into the Data folder 405 of the image forming device 101, without using the data inside the USB storage 204. Upon completion of all operations recorded in the script 1000, the processing execution unit 803 displays an initial installation operations completion screen 1500 shown in FIG. 14B, and processing terminates.

Figure 14B:
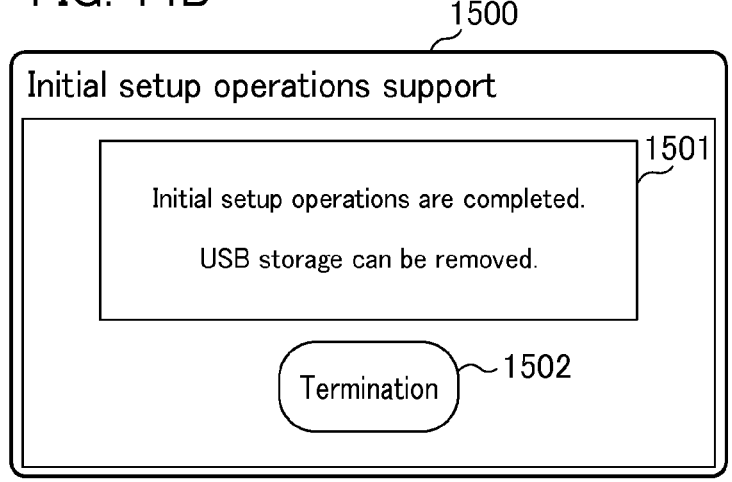

FIG. 14B shows the initial installation operations completion screen 1500. The initial installation operations completion screen 1500 has a message display part 1401, and a termination button 1402. The processing execution unit 803 displays a message indicating that operations have been completed in the message display part 1302. As the USB storage 204 may also be removed in conjunction with processing termination, the processing execution unit 803 displays information indicating that the USB storage 204 can be removed. In FIG. 14B, it is displayed that the USB storage 204 can be removed, but in the case where the USB storage 204 has already been removed, it is also acceptable to have the processing execution unit 803 not display that the USB storage 204 can be removed.

The termination button 1402 is a button for closing the UI screen of the initial installation operations support program. When the termination button 1402 is pressed, the screen transitions to the main menu screen shown in FIG. 6. Note that if the initial installation operations support program is not used apart from initial installation operations, the initial installation operations support program itself can be uninstalled when the termination button 1402 is pressed.

Returning to the description of FIG. 11, in S1112, the processing execution unit 803 judges whether copy processing is underway with respect to the data required for the next script processing. In the case where copy processing is under-way with respect to the data required for the next script processing, the processing advances to S1114. In the case where copy processing is not underway with respect to the data required for the next script processing, the processing advances to S1113.

In S1113, the processing execution unit 803 initiates the next script processing. The processing then returns to S1107, and standby ensues until script processing or copy processing is complete.

In S1114, the processing execution unit 803 judges whether copy processing has been completed with respect to the data to be used in the next script processing. In the case where copy processing has been completed with respect to the data to be used in the next script processing, the processing advances to S1115. The processing execution unit 803 then rewrites the path recorded in the script information to the copy destination (S1115), and the processing advances to S1116. In the case where copy processing is not completed with respect to the data to be used in the next script processing, the processing returns to S1114, and standby ensues until the copy processing is completed.

Note that in S1102 of FIG. 11, the script analysis unit 804 reads the script file 912, but it is also acceptable to simply have the script analysis unit 804 only copy the script to the Data folder 405. In this case, with respect also to the processing in S1109, the processing execution unit 803 may execute rewriting of the script 1000 that is copied to the Data folder 405.

In the case where multiple steps have the same order value recorded in the script 1000, the completion of numerous copy processing can accelerate the timing of the removal of the USB storage 204. Accordingly, in this case, the processing execution unit 803 determines the sequence with which the data corresponding to the respective multiple steps is saved, based on the size of the data to be copied in the respective multiple steps. Specifically, data to be copied that is of large size is preferentially subjected to copy processing by the processing execution unit 803.

In the case where script processing is executed using the data of the Data folder 405, the processing execution unit 803 may record the path of the employed data in the log of execution results. Furthermore, the processing execution unit 803 may also record together both the path of the USB storage 204 and the path of the Data folder 405 in the log at the time of execution, so as to enable discernment of which data copy of the USB storage 204 was used.

According to the apparatus of the present invention, it is possible to remove an external storage device, and proceed to the following software installation operation while a software installation operation is underway according to a script in the external storage device. Accordingly, even in the case where a portable storage medium is inserted for purposes of initial installation operations of an image forming device, greater efficiency of all initial installation operations can be achieved, because it is possible to remove the portable storage medium, and proceed to the next operation during initial installation operations processing for one unit.

(Second Embodiment)

The image forming device of the first embodiment executes the operational contents recorded in the script in order from the beginning, while simultaneously copying from the USB storage to the image forming device in order from the data required for the final processing. However, in the case where the capacity loaded in the image forming device itself or the capacity that can be used by an extended program is small, there is the possibility that data of the USB storage may not be copied, and that processing may be interrupted. Thus, an image forming device of the second embodiment enables removal of the USB storage as quickly as possible without interrupting processing by conducting a capacity check of the copy destination prior to copying. Apart from the processing shown in the flowchart of FIG. 11, the second embodiment is identical to the first embodiment.

Figure 15:
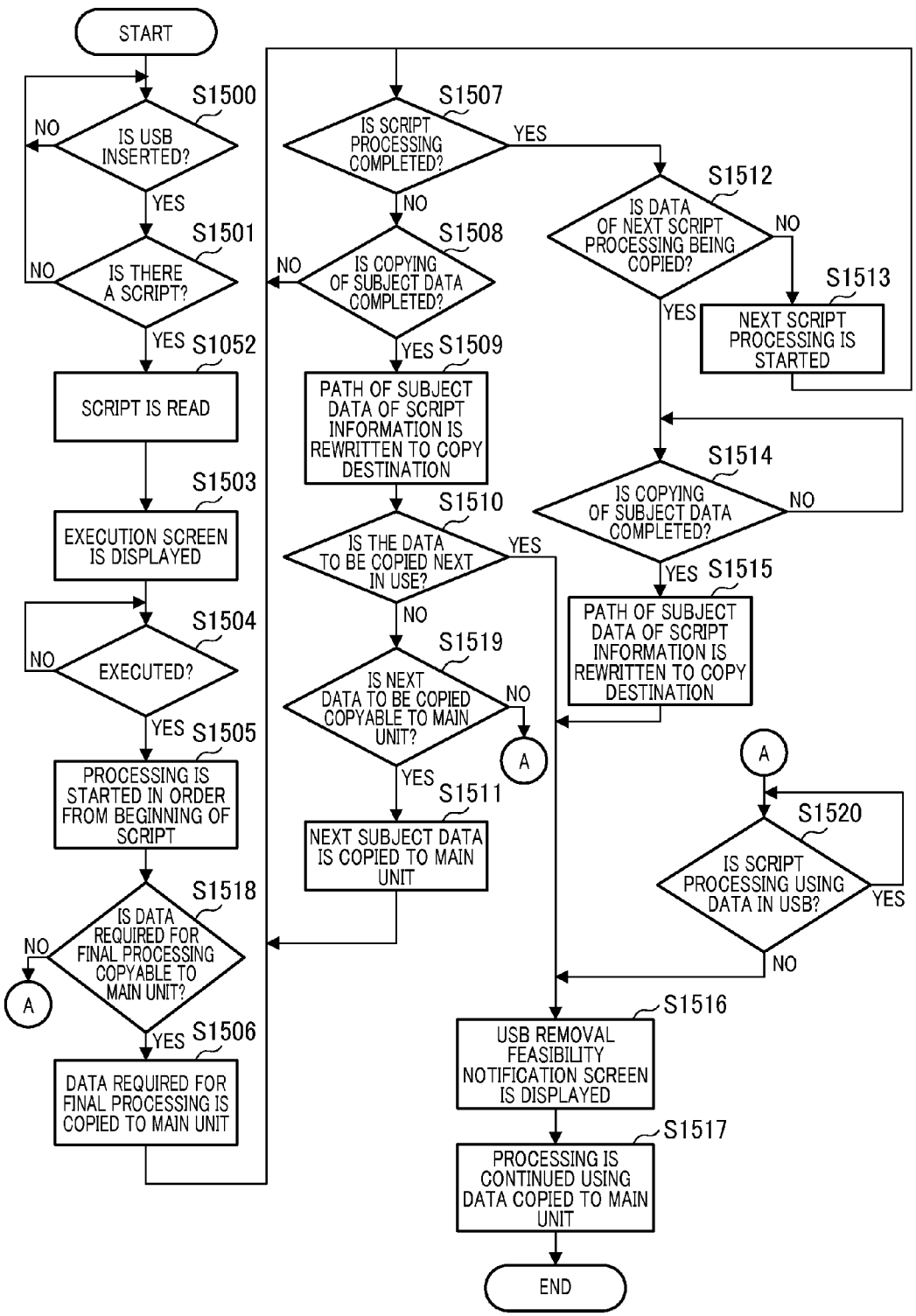
FIG. 15 is a flowchart which describes software installation processing of a second embodiment.

FIG. 15 is a flowchart which describes software installation processing of the second embodiment. As S1500 to S1517 are identical to the processing of S1110 to S1117 of FIG. 11, and a description thereof is omitted.

In S1518, the processing execution unit 803 judges whether the data required for the final processing can be copied to the Data folder 405. That is, the processing execution unit 803 judges whether a prescribed saving capacity would be exceeded if the data of the copy source is saved. With respect to this judgment processing, a judgment is obtained from the results of the following two types of checks. The first is a judgment as to whether a data capacity of a copy source is accommodated by the available capacity of the HDD 215. The second is a judgment as to whether a data capacity of a copy source is accommodated by a capacity based on a maximum file space usage amount stated in the resource information content part 502 of the manifest 500.

In the case where a data capacity of a copy source is accommodated by the available capacity of the HDD 215, and is accommodated by a capacity based on the aforementioned maximum file space usage amount, the processing execution unit 803 judges that the data required for the final processing can be copied. It is also acceptable to use either one of these two judgments alone.

In the case where it is judged that the data required for the final processing can be copied, the processing advances to S1506. In the case where it is judged that the data required for the final processing cannot be copied, the processing advances to S1520.

In S1519, the processing execution unit 803 judges whether the data to be copied next can be copied to the Data folder 405. In this processing, as well, the processing execution unit 803 judges whether copy processing is feasible or not based on the results of the aforementioned two types of judgment used in S1518. In the case where it is judged that the data to be copied next can be copied to the Data folder 405, the processing advances to S1511. In the case where it is judged that the data to be copied next cannot be copied to the Data folder 405, the processing advances to S1520.

In S1520, the processing execution unit 803 judges whether the data in the USB storage 204 is being used in script processing. That is, the processing execution unit 803 judges whether or not the data that is used by the processing execution unit 803 has switched from data in the USB storage 204 to data in the Data folder 405 after copy processing. In the case where script processing is using data in the USB storage 204, the processing returns to S1520. In the case where script processing is not using data in the USB storage 204, the processing advances to S1516.

In the case where even one piece of data could not be copied due to insufficient capacity in S1518, it is necessary to await completion of all operations according to S1520. Moreover, as data could not be copied, the processing of S1517 is skipped.

According to the image forming device of the second embodiment, in the case where the capacity loaded in the image forming device itself or the capacity that can be used by the extended program is small, the USB storage can be removed as quickly as possible without interruption of processing by conducting a capacity check of the copy destination prior to copy processing. By this means, it is possible to promote greater efficiency of all initial installation operations.

(Third Embodiment)

An image forming device of a third embodiment promotes greater efficiency of all initial installation operations by multiply dividing copy processing from the USB storage to the image forming device according to an operating time corresponding to operational content. Apart from the processing shown by the flowcharts of FIG. 11 and FIG. 15, the third embodiment is identical to the first embodiment and the second embodiment.

Figure 16:
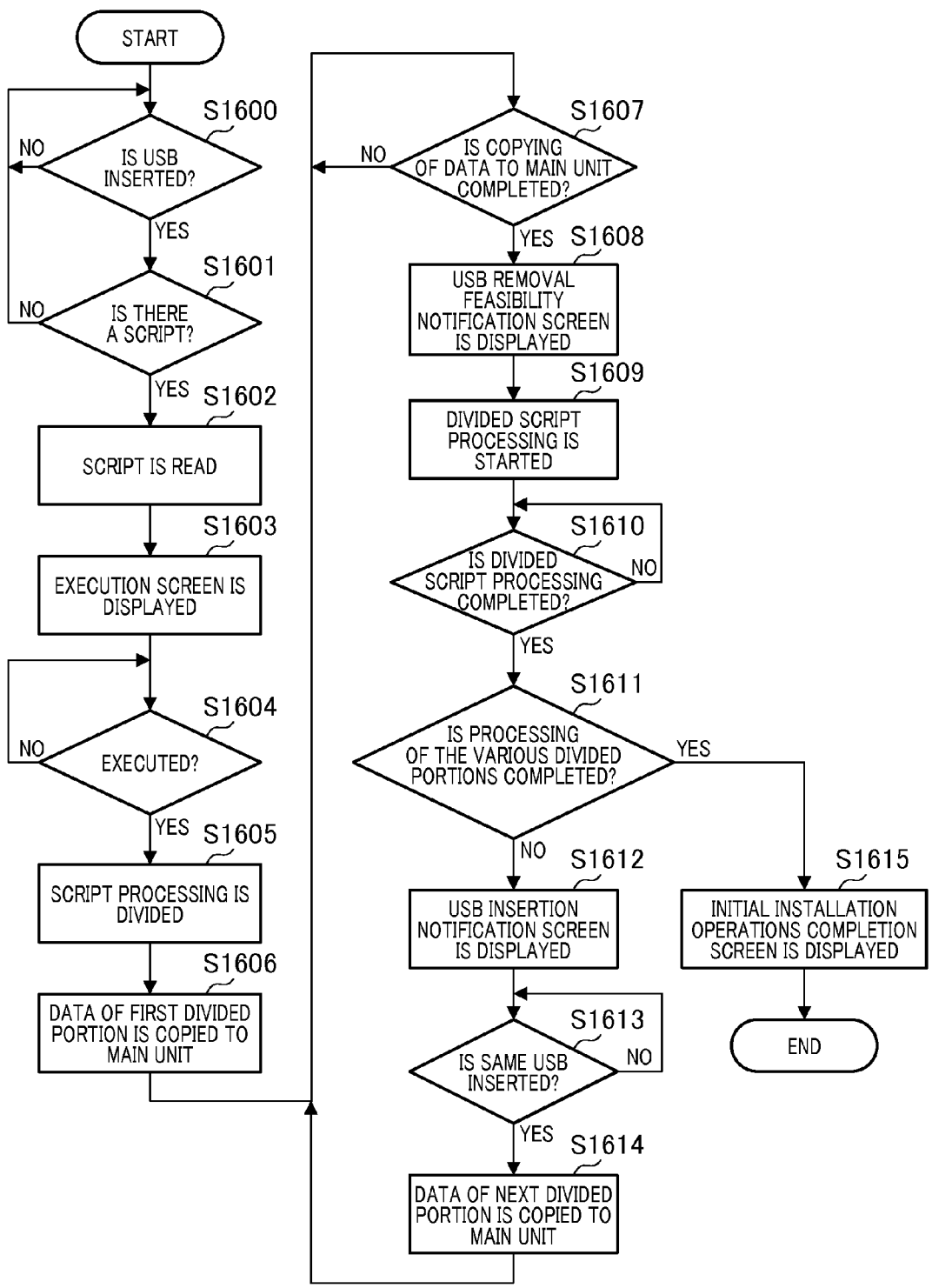
FIG. 16 is a flowchart which describes software installation processing of a third embodiment.

FIG. 16 is a flowchart which describes software installation processing of the third embodiment. As the processing of S1600 to S1604 is identical to the processing of S1100 to S1104 of FIG. 11, description thereof is omitted.

In S1605, the script analysis unit 804 divides script processing. That is, the script analysis unit 804 conducts dividing operations for purposes of multiply dividing the various operations designated by the script 1000. The script analysis unit 804 divides the multiple steps into divided steps according to the order of contents of the respective step included in the multiple steps recorded in the script. For example, the script analysis unit 804 divides the processing in two so that approximately identical capacities are obtained based on the overall capacity of the data of all operations. This is a dividing method which assumes that processing becomes time-consuming as data capacity increases.

The method of dividing script processing may be recorded in the script 1000, or the initial installation operations support program may be internally provided with its definition. For example, in the case of the script shown in FIG. 10, in the case where the capacity of the data referenced by the processing 1003 is 5 MB, and where the overall capacity of the data referenced from the processing 1004 to the processing 1007 is 5 MB, the script analysis unit 804 divides the script processing at up to the processing 1003.

Next, the processing execution unit 803 copies the data of the first divided portion from the USB storage 204 to the Data folder 405 (S1606). The processing execution unit 803 then judges whether the copy processing of S1606 has been completed (S1607). In the case where the copy processing has been completed, the processing advances to S1608. In the case where the copy processing has not been completed, the processing returns to S1607. In S1608, the processing execution unit 803 displays the USB removable feasibility notification screen 1400 shown in FIG. 14A via the UI control unit 801.

Next, the processing execution unit 803 initiates the script processing divided in S1605 using the data in the Data folder 405 (S1609). Subsequently, the processing execution unit 803 judges whether they divided script processing has been completed (S1610). In the case where the divided script processing has been completed, the processing advances to S1611. In the case where the divided script processing has not been completed, the processing returns to S1610, and standby ensues until the divided script processing is completed.

In S1611, the processing execution unit 803 judges whether all of the divided script processing has been executed. In the case where the divided processing has been entirely completed, the processing advances to S1615. The processing execution unit 803 then displays the initial installation operations completion screen 1500 shown in FIG. 14B.

In the case where there exists uncompleted processing among the divided processing, the processing advances to S1612. The processing execution unit 803 then displays a USB removable feasibility notification screen 1600 shown in FIG. 14C via the UI control unit 801 (S1612).

Figure 14C:
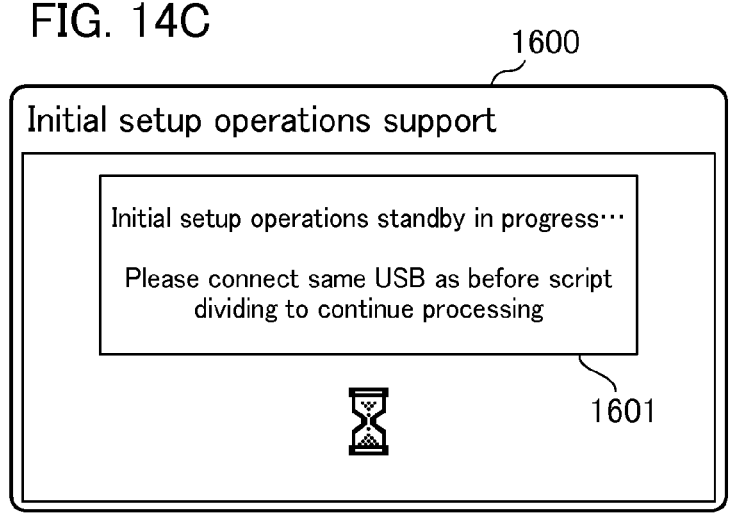

FIG. 14C shows the USB removable feasibility notification screen 1600. The USB removable feasibility notification screen 1600 has a message display part 1303 and an implementation icon.

The processing execution unit 803 displays a message indicating that initial installation operations are suspended in the message display part 1303. The processing execution unit 803 also displays a message urging insertion of the same USB used when the script was divided in order to continue the processing.

Returning to the description of FIG. 16, in S1613, the storage management unit 802 judges whether the same USB storage 204 used at the time of script dividing in S1605 has been inserted into the image forming device 101. In the case where the same USB storage 204 used at the time of script dividing has been inserted into the image forming device 101, the processing advances to S1614.

In the case where a USB storage 204 different from that used at the time of script dividing is inserted into the image forming device 101, the data required for continuing the script does not exist. Accordingly, in this case, the processing returns to S1613, and processing is put on standby until insertion of the same USB storage 204 used at the time of script dividing.

The storage management unit 802 judges as follows whether the inserted USB storage is identical to the USB storage that was used at the time of script dividing. The storage management unit 802 checks whether the script file 912 stored in the USB storage is identical to the script that is temporarily saved in the RAM 211. In the case where the script file 912 is identical to the script in the RAM 211, the storage management unit 802 judges that the inserted USB storage is identical to the USB storage used at the time of script dividing. In this processing, as it is sufficient if the script can be continued, it is not strictly necessary to have the same USB storage 204.

In S614, the processing execution unit 803 copies the data to be used in the script processing that has yet to be executed among the divided script processing to the Data folder 405. For example, in the case of the aforementioned script 1000 shown in FIG. 10, the processing execution unit 803 copies the 5 MB of data required from the processing 1004 to the processing 1007 to the Data folder 405.

According to the image forming device of the third embodiment, it is possible to multiply divide script processing, and remove the USB storage when copying of the data required for the divided processing is completed. By this means, it is possible to promote increased efficiency of all initial installation operations.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171075, filed Aug. 21, 2013 which is hereby incorporated by reference herein in its entirety.

What is claimed is:

1. An apparatus including one or more processors to enable a connection of an external storage device, the apparatus comprising:
    an installing unit configured to conduct software installation that installs software saved in the external storage device and setting values corresponding to the software, according to a script acquired from the external storage device after the external storage device is connected;
    a saving unit configured to acquire from the external storage device and save the software and the setting values corresponding to the software that relate to software installation in a subsequent step to be conducted according to the script, when the installing unit conducts the software installation of a preceding step according to the script; and
    a notifying unit configured to provide a notification that urges disconnection of the external storage device in response to saving by the saving unit of the software and the setting values corresponding to the software that relate to software installation until a step directly after the software installation step that is being conducted by the installing unit.

2. The apparatus according to claim 1, wherein the installing unit carries out the software installation after disconnection of the external storage device, using the software and the setting values corresponding to the software that were saved in the apparatus by the saving unit.

3. The apparatus according to claim 2, wherein a path to the software and the setting values corresponding to the software used in the software installation by the installing unit is recorded in the script; and
    wherein, after completion of saving of the software and the setting values corresponding to the software, the saving unit changes the path of the software and the setting values corresponding to the software which are recorded in the script and for which the saving was completed from the external storage device to the apparatus.

4. The apparatus according to claim 1, wherein the order of steps of the software installation is recorded in the script; and
    wherein the saving unit preferentially saves the software and the setting values corresponding to the software that relate to software installation of a step that is later in the order recorded in the script.

5. The apparatus according to claim 4, wherein, when there are multiple steps with the same order recorded in the script, the saving unit determines an order of saving of the software and the setting values corresponding to each of the multiple steps based on a size of the software and the setting values corresponding to each of the multiple steps.

6. The apparatus according to claim 1, wherein, in cases where a prescribed capacity is exceeded when saving the software and the setting values, the installing unit conducts the software installation using the software and the setting values that are saved in the external storage device, and the notifying unit provides a notification urging disconnection of the external storage device after completion of the software installation that has used the software and the setting values saved in the external storage device.

7. The apparatus according to claim 6, wherein a value of the prescribed capacity is a value of a saving capacity of a storage unit with which the apparatus is provided, or a capacity value based on a value stated in a prescribed manifest file.

8. An apparatus including one or more processors to enable a connection of an external storage device, the apparatus comprising:
   a dividing unit configured to divide steps of a software installation that are recorded in a script containing instructions for the software installation acquired from the external storage device connected to the apparatus into multiple divided steps;
   a saving unit configured to acquire from the external storage device and save software and setting values corresponding to the software related to the divided steps;
   a notifying unit configured to provide a notification urging disconnection of the external storage device each time upon completion of saving of the software and the setting values corresponding to the software related to the divided steps; and
   an installing unit configured to conduct the software installation using the software and the setting values corresponding to the software for which the saving was completed after disconnection of the external storage device;
   wherein the notifying unit provides a notification urging connection of the external storage device to the apparatus after completion of software installation by the installing unit using the software and the setting values corresponding to the software for which the saving was completed, and the saving unit acquires from the external storage device and saves software and setting values corresponding to the software that relate to a next divided step.

9. The apparatus according to claim 8, wherein the saving unit divides a step of the software installation into multiple divided steps according to an order of various steps of the software installation recorded in the script.

10. A control method of an apparatus enabling connection of an external storage device, comprising:
    performing software installation which installs software and setting values corresponding to the software that are saved in the external storage device according to a script acquired from the external storage device after connection of the external storage device;
    acquiring from the external storage device and saving the software and the setting values corresponding to the software related to software installation of a subsequent step to be conducted according to the script, when software installation of a preceding step is being conducted according to the script in the installation; and
    performing notification which urges disconnection of the external storage device in response to saving by the saving step of the software and the setting values corresponding to the software related to software installation until a step directly after a software installation step being conducted in the installation.

11. A non-transitory storage medium on which is stored a computer program for making a computer execute a control method of an apparatus enabling connection of an external storage device, comprising:
    performing software installation which installs software and setting values corresponding to the software that are saved in the external storage device according to a script acquired from the external storage device after connection of the external storage device;
    acquiring from the external storage device and saving the software and the setting values corresponding to the software related to software installation of a subsequent step to be conducted according to the script, when software installation of a preceding step is being conducted according to the script in the installation; and
    performing notification which urges disconnection of the external storage device in response to saving by the saving step of the software and the setting values corresponding to the software related to software installation until a step directly after a software installation step being conducted in the installation.

* * * * *